US008540300B1

(12) United States Patent
Merkel

(10) Patent No.: US 8,540,300 B1
(45) Date of Patent: Sep. 24, 2013

(54) COIN BOX

(75) Inventor: Nicholas Earl Merkel, Canton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 25 days.

(21) Appl. No.: 13/435,505

(22) Filed: Mar. 30, 2012

(51) Int. Cl.
*B60N 3/12* (2006.01)

(52) U.S. Cl.
USPC .................................... 296/37.8; 296/37.12

(58) Field of Classification Search
USPC ...... 296/37.9, 37.12, 37.13, 37.8; 312/321.5, 312/328; 16/82
See application file for complete search history.

(56) References Cited

U.S. PATENT DOCUMENTS

| | | | | |
|---|---|---|---|---|
| 2,505,324 | A * | 4/1950 | Hendricks | 220/477 |
| 5,385,378 | A * | 1/1995 | Hakamada et al. | 296/37.12 |
| 5,533,772 | A * | 7/1996 | Volkers et al. | 296/37.9 |
| 6,629,716 | B2 * | 10/2003 | Shibata et al. | 296/70 |
| 6,899,364 | B2 | 5/2005 | Park et al. | |
| 7,226,103 | B2 | 6/2007 | Chang | |
| 2005/0134074 | A1 * | 6/2005 | Youngs et al. | 296/37.13 |
| 2009/0108608 | A1 * | 4/2009 | Porcs | 296/37.12 |
| 2011/0127793 | A1 * | 6/2011 | Gwon | 296/37.8 |
| 2013/0026778 | A1 * | 1/2013 | Biggs | 296/37.8 |

\* cited by examiner

*Primary Examiner* — Jason S Morrow
(74) *Attorney, Agent, or Firm* — Gifford, Krass, Sprinkle, Anderson & Citkowski, P.C.

(57) ABSTRACT

A coin box assembly having an anti jamming feature for a vehicle. The coin box assembly can have a coin box with a back wall with a top end, a front wall, and a pair of side walls extending between the back wall and the front wall. The coin box assembly can also have a cover that encloses the coin box when box is in a closed position. The back wall is dimensioned such that the top end is a predefined distance from the cover, the predefined distance providing a clearance. The clearance allows the coin box to pivot between the closed position and an open position, and yet prevents a small object such as a coin from being located between the back wall top end and the cover and thereby preventing the coin box from pivoting.

20 Claims, 2 Drawing Sheets

COIN BOX

FIELD OF THE INVENTION

The present invention is related to a coin box assembly, and in particular, to a coin box assembly with an anti jamming feature that can be manufactured using an injection molding process using a simple two-die system.

BACKGROUND OF THE INVENTION

The use of a coin box within a vehicle is known. In some instances, the coin box can be pivoted between a closed position and an open position, the open position providing access to a compartment that can hold coins, jewelry, and the like. It is also known that items held within the compartment can result in jamming the pivotal movement of the coin box when, e.g. a coin, becomes located between the coin box and a surrounding structure. Therefore, a coin box that has an anti-jamming feature would be desirable. In addition, a coin box having an anti jamming feature that can be easily produced using an injection molding process with a simple two-piece die would also be desirable.

SUMMARY OF THE INVENTION

A coin box assembly for a vehicle is disclosed. The coin box assembly can have a coin box with a back wall, a front wall oriented at an acute angle to the back wall, and a pair of side walls extending between the back wall and the front wall. The back wall can have a front side, a back side, and a top end extending between the front side and the back side. The coin box can also have a catch flange oriented at an acute angle to the back side of the back wall, the catch flange having a catch tab and at least one aperture between the back side of the back wall and the catch tab.

A cover having a top wall with a stop face can be included and the coin box can be pivotally attached to the cover. The coin box can be pivotal between a closed position and an open position and the catch flange can be dimensioned such that the catch tab contacts the stop face of the cover when the coin box pivots into the open position. In addition, the top end of the back wall can be spaced apart from the cover and/or catch face a predefined distance to provide a clearance that allows the coin box to pivot and yet prevents a small object such as a coin from fitting between the back wall top end and the cover and/or catch face when the coin box is in the closed position. Such a back wall having a top end located proximate to the stop face when the coin box is in the closed position can be considered an anti jamming feature.

It is appreciated that the back wall, the front wall, and the pair of side walls provide a compartment with a top opening and the top wall of the cover provides a top surface over the opening that encloses the compartment when the coin box is in the closed position. In addition, the opening of the compartment can pivot out from under the top surface when the coin box pivots from the closed position to the open position.

The catch flange and the back wall can be in the shape of a y-shaped member when the coin box is viewed from a side view and the catch flange can have a bottom end spaced apart from the back side of the back wall with the at least one aperture located between the bottom end and the back wall. In addition, the at least one aperture affords for an injection molding die to fit therethrough and thereby allows a simple two-piece die system to be used to manufacture the coin box without die lock.

The coin box can include a first support wall that extends normal to and between the back side of the coin box back wall and the catch flange. In some instances, the coin box can include a second support wall that extends normal to and between the back side of the back wall and the catch flange, the second support wall spaced apart from the first support wall. In addition, the at least one aperture can be located between the first and second support walls. In other instances, a third support wall can extend normal to and between the back side of the back wall and the catch flange, the third support wall located between and spaced apart from the first support wall and the second support wall. In such instances, the at least one aperture can be a first aperture and a second aperture, the first aperture located between the first support wall and the third support wall, and the second aperture located between the second support wall and the third support wall.

The first and second apertures between the back side of the back wall and the catch flange afford for a generally complex shape such as the coin box to be manufactured using the injection molding die process with a simple two-piece die system. In particular, and without the apertures, a third die would be required to form the extended back wall portion above the catch flange. As such, the apertures allow for a die having a shape to form the extended back wall of the coin box to still be removed in a "downward" direction without die lock after the component has been formed.

It is appreciated that the term "die lock" refers to, e.g. a two die piece set-component combination that would prevent the two dies from being withdrawn away from an injection molded component without damage to the component, i.e. a shape of the formed component prevents withdrawal of one of both of the dies and at least one of the dies is "lock" in its position. Therefore, more than two dies can be required to make a component, each of the dies having to slide or be removed independently, and thus the cost of the injection molding operation increases.

The catch flange can have a top end and the catch tab can extend beyond the top end. In such an embodiment, the top wall can have a channel in which the catch tab is located at least partially therewithin. The channel can have a front end with the stop face, a back end and a channel aperture or opening between the front end and the back end thereof.

In some instances, the catch flange can include three spaced apart catch tabs and the top wall of the cover can have three spaced apart channels with each of the three spaced apart tabs located at least partially within one of the three spaced apart channels. It is appreciated that each of the spaced apart channels can have a stop face at a front end of the channel and/or a channel aperture between a front end and a back end of each channel. In addition, each of the front ends can have ledge that overhangs the stop face and extends into the channel aperture.

DETAILED DESCRIPTION OF THE INVENTION

A coin box assembly that has an anti jamming feature is disclosed. In addition, the coin box assembly can be made using an injection molding process with a simple two-piece die system. As such, the coin box assembly has use as a component for a motor vehicle.

The coin box assembly includes a coin box and a cover for the coin box. The coin box can have a back wall, a front wall, and a pair of spaced apart side walls extending between the back wall and the front wall, the walls providing a compartment with a top opening. The coin box can be pivotally attached to a surrounding structure and thus be pivotal between a closed position and an open position. In the closed position, a cover having a top wall encloses the opening of the compartment and thus prevents small objects such as coins, jewelry, etc. from falling or being bounced out of the coin box. In addition, the cover can have a stop face that engages a catch tab of the coin box when it moves from the closed position to the open position. The back wall can be dimensioned such that a top end of the wall is proximate to the stop face with a predefined distance therebetween providing a clearance that allows the coin box to pivot but prevents a small object such as a coin, a piece of jewelry, etc. from fitting between the top end and the catch face and thereby preventing and/or causing a jam of the pivotal movement of the coin box.

The catch tab of the coin box can be part of a catch flange that is oriented at an acute angle to the back wall, the catch flange and back wall having the shape of a y-shaped member when the coin box is viewed from the side. In addition, a support wall can extend normal to and between the back side of the back wall and the catch flange.

The catch flange can have at least one aperture between the catch tab and the back wall, the at least one aperture allowing for an injection molding die to fit therethrough and afford for injection molding of the coin box using a simple two-piece die system without die lock. In this manner, the back wall can have a relatively tall dimension or height to afford an anti-jamming feature for the coin box assembly and yet allow a two-piece die system to be used to manufacture the coin box.

Figure 1:
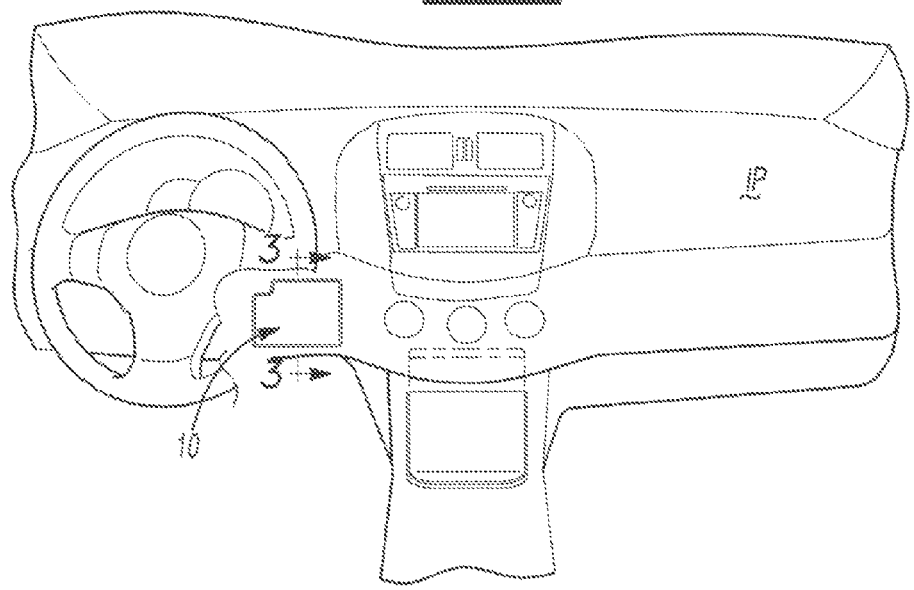
FIG. 1 is a front view of a vehicle instrument panel.
Figure 2:
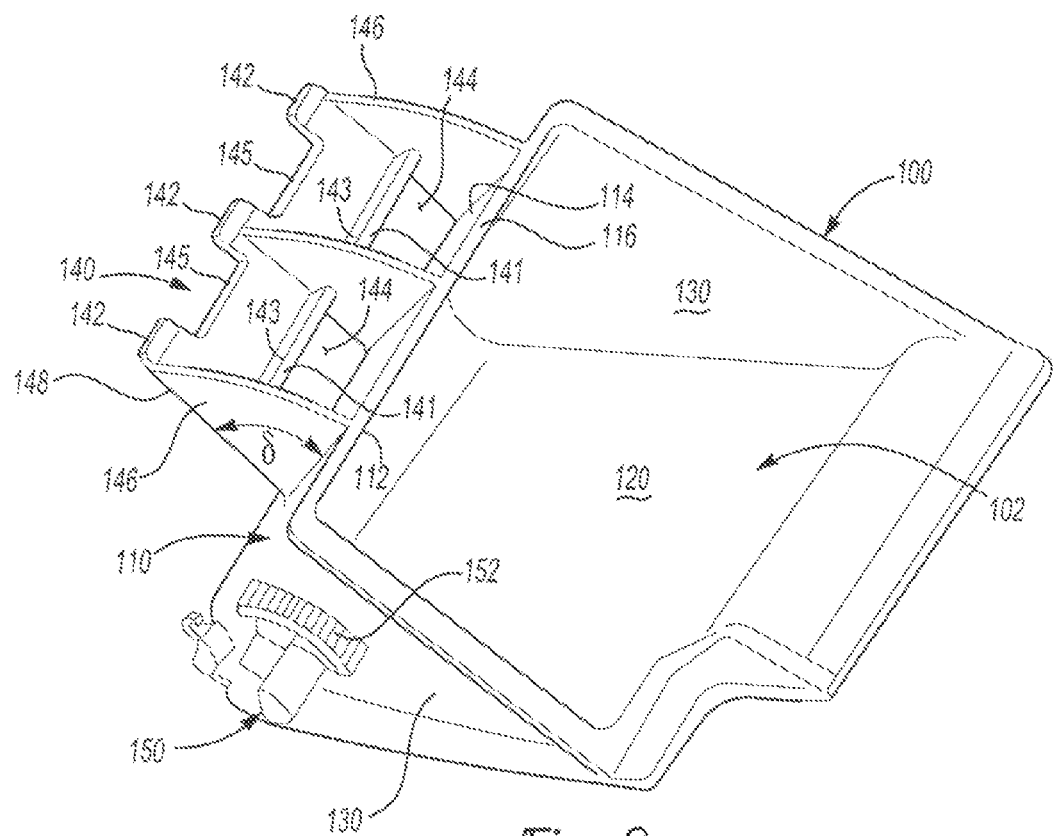
FIG. 2 is a perspective view of a coin box according to an embodiment of the present invention.
Figure 3:
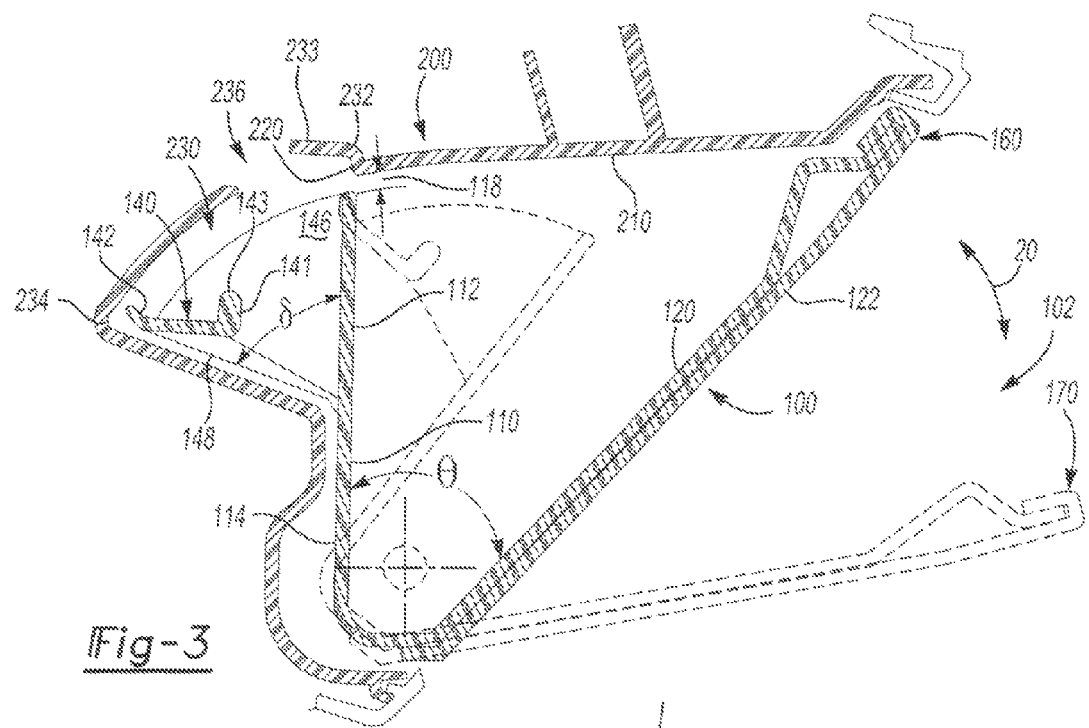
FIG. 3 is a side cross-sectional view of a coin box assembly including the coin box shown in FIG. 2 according to an embodiment of the present invention.

Turning now to FIG. 1, a front view of a vehicle instrument panel IP having a coin box assembly 10 is shown. In addition, FIG. 2 provides a top perspective view of a coin box 100 that is part of the coin box assembly 10. The coin box 100 can have a back wall 110, a front wall 120, and a pair of spaced apart side walls 130 extending between the back wall 110 and the front wall 120. As shown in FIG. 3, the front wall 120 is oriented at an acute angle θ from the back wall 110. It is appreciated that the back wall 110, the front wall 120, and the side walls 130 provide a compartment with an opening 102 that can be used to place small objects such as coins, jewelry, candy, and the like. The back wall 110 can have a front side 112 and a back side 114 and a top end 116 of the back wall 110 can extend between the front side 112 and the back side 114.

The coin box 100 can be pivotally attached to a cover 200 using a pivot axis or shaft 150 as is known to those skilled in the art. In some instances, the pivot axis 150 can have a set of gear teeth 152 that can engage a tensioning device (not shown) as is known in the art.

Oriented at an acute angle γ from the back side 114 of the back wall 110 can be a catch flange 140. Extending between the catch flange 140 and the back side 114 of the back wall 110 can be a support wall 146. The catch flange 140 can have a catch tab 142 and an aperture 144 located between the catch tab 142 and the back side 114 of the back wall 110. In some instances, the aperture 144 can be located between the back side 114 of the back wall 110 and a bottom end 141 of the catch flange 140. In addition, the bottom end 141 can have a stiffening ridge 143 that extends at an angle from the catch flange 140. It is appreciated that the stiffening ridge 143 can extend at an angle greater than 0 and less than 180° from the catch flange 140.

As illustrated in FIG. 2, the coin box 100 can include a first support wall 146 and a second spaced apart support wall 146 with an aperture 144 therebetween. In addition, a third support wall 146 can be spaced apart and located between the first support wall 146 and the second support wall 146. In such an instance, a first aperture 144 can be located between the first support wall and the third support wall, and a second aperture can be located between the second support wall and the third support wall. Both the first aperture and the second aperture are located between the back side 114 of the back wall 110 and the bottom edge 141 of the catch flange 140. The catch flange can also have a top end 145 with one, two, three, or more catch tabs 142 extending beyond said top end 145.

It is appreciated that the back wall 110, the catch flange 140, and/or the support wall 146 provide a y-shaped member when the coin box 100 is viewed from a side view. In addition, the back wall 110 is dimensioned such that the top end 116 is located proximate to a bottom surface 210 of the cover 200 when the coin box 100 is in a closed position 160. In addition, the top end 116 can be located a predefined distance from the bottom surface 210 such that a clearance 118 is provided.

The clearance 118 allows for the coin box to pivot between a closed position 160 and an open position 170 and yet prevents a small object such as a coin to fit between and thereby jam the back wall 110 and the bottom surface 210 of the cover 200. Furthermore, when the coin box 100 pivots to the open position 170, the catch tab 142 can come into contact with a stop face 220 that is part of the cover 200. The stop face 220 can be part of a channel 230 that has a front end 232 and a back end 234. The stop face 220 can be located at the front end 232 and an aperture or opening 236 can be present between the front end 232 and the back end 234.

In some instances, the cover 200 can have a ledge 233 extending from the stop face 232 and also extending into the channel aperture 236. It is appreciated that the channel aperture 236 can afford for injection molding of the cover 200 using a simple two-piece die system. In addition, the ledge 233 can reduce the size of the channel aperture 236 and thus prevent or reduce the tendency for objects such as wiring to pass through the channel aperture 236.

Figure 4:
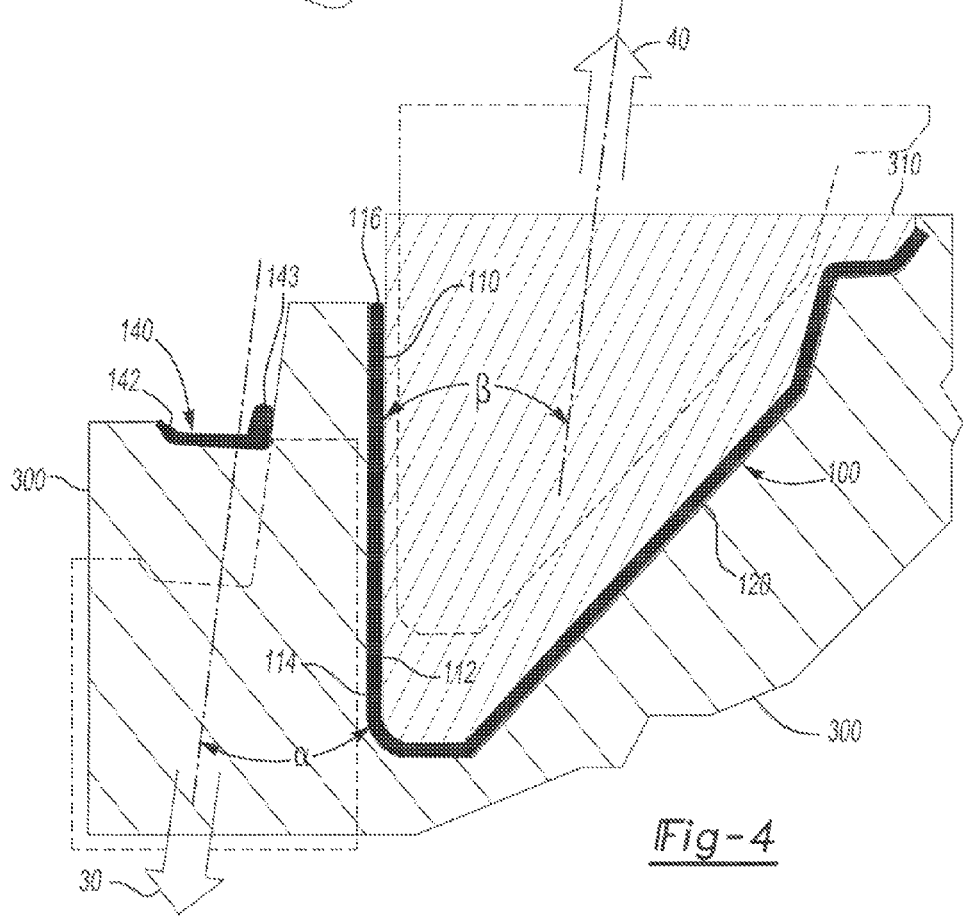
FIG. 4 is a side cross-sectional view of a two-piece die system used for injection molding of the coin box shown in FIGS. 2 and 3 according to an embodiment of the present invention.

Turning now to FIG. 4, a schematic illustration of a two-piece die system for injection molding of the coin box 100 is shown. The two-piece die system can have a first die 300 and a second die 310 that when located proximate to each other provide a space in which a polymer material can be injected in order to form the coin box 100 having the back wall 110, front wall 120, the pair of side walls 130, and the catch flange 140. Furthermore, with the aperture 144 located between the back wall 110 and at least part of the catch flange 140, the dies 300 and 310 can be withdrawn without die lock after the coin box 100 has been formed as indicated by arrows 30 and 40. Stated differently, a simple two-piece die system schematically illustrated by dies 300 and 310 can be used to produce a relatively complex coin box 100 and additional dies are not required.

It is appreciated that the dies 300 and 310 are removed or withdrawn at an angle α and β, respectively, the angles α and β typically within the range of 5 to 10°. As such, the aperture 144 affords for the dies 300 and 310 to be withdrawn and still provide a back wall 110 dimensioned to provide a clearance 118 that prevents a small object from fitting therewithin and thus preventing jamming of the coin box 100 when pivoting between the closed position and the open position. Given that the thickness of a United States dime is approximately 1.35 millimeters (mm), the clearance 118 can be less than 1.35 mm. For example, the clearance 118 can be 1.30 mm, 1.20 mm. 1.10 mm. 1.00 mm. 0.90 mm, 0.80 mm, 0.70 mm, 0.60 mm or 0.50 mm.

The coin box 100 and cover 200 can be made from any material known to those skilled in the art, illustratively including polymers, metals, ceramics, and the like. In addition, the coin box 100 can have additional layers or materials 122 placed thereon for aesthetically pleasing purposes as is known to those skilled in the art.

Given the above disclosure, it is appreciated that modifications, changes, and the like will be evident to one skilled in the art and thus the above description and figures are not limiting with respect to the scope of the invention. As such, it is the claims and all equivalents which define the scope of the invention.

I claim:

1. A coin box assembly for a motor vehicle comprising:
   a coin box having a back wall having a top end, a front wall, a back side, and a pair of side walls extending between said back wall and said front wall;
   a catch flange oriented at an acute angle to said back wall, said catch flange having a catch tab and at least one aperture between said back side and said catch tab;
   a cover having a top wall with a stop face;
   said catch flange dimensioned such that said catch tab contacts said stop face when said coin box pivots into said open position;
   said top end of said back wall spaced apart from said cover a predefined distance to provide a clearance, said clearance allowing said coin box to pivot between a closed position and an open position, said clearance also preventing a coin from fitting between said top end and said cover when said coin box is in said closed position;
   said at least one aperture dimensioned for an injection molding die to fit therethrough and allow a two-piece die to be used to manufacture said coin box without die lock.

2. The coin box assembly of claim 1, wherein said back wall, said front wall and said pair of side walls provide a compartment with an opening.

3. The coin box assembly of claim 2, wherein said top wall of said cover has a bottom surface over said opening that encloses said compartment when said coin box is in said closed position.

4. The coin box assembly of claim 3, wherein said opening pivots out from under said bottom surface when said coin box pivots from said closed position to said open position.

5. The coin box assembly of claim 1, wherein said catch flange and said back wall form a y-shaped member when viewed from a side view.

6. The coin box assembly of claim 5, further comprising a first support wall extending normal to and between said back side of said back wall and said catch flange.

7. The coin box assembly of claim 6, wherein said catch flange has a bottom end spaced apart from a back side of said back wall.

8. The coin box assembly of claim 7, wherein said at least one aperture is located between said back side of said back wall and said bottom end of said catch flange.

9. The coin box assembly of claim 8, further comprising a second support wall extending normal to and between said back side of said back wall and said catch flange, said second support wall spaced apart from said first support wall.

10. The coin box assembly of claim 9, wherein said at least one aperture is located between said first support wall and said second support wall.

11. The coin box assembly of claim 10, further comprising a third support wall extending normal to and between said back side of said back wall and said catch flange, said third support wall located between and spaced apart from said first support wall and said second support wall.

12. The coin box assembly of claim 11, wherein said at least one aperture is a first aperture and a second aperture, said first aperture located between said first support wall and said third support wall, said second aperture located between said second support wall and said third support wall.

13. The coin box assembly of claim 12, wherein said catch flange has a bottom end bounding said first aperture and said second aperture.

14. The coin box assembly of claim 13, wherein said bottom end has a stiffening ridge extending at an angle from said catch flange.

15. The coin box assembly of claim 14, wherein said catch flange has a top end and said catch tab extends beyond said top end.

16. The coin box assembly of claim 15, wherein said top wall has a channel, said catch tab located at least partially within said channel.

17. The coin box assembly of claim 16, wherein said channel has a front end with said stop face and a back end, said catch tab contacting said stop face when said coin box is in said open position.

18. The coin box assembly of claim 17, wherein said channel has a channel aperture between said front end and said back end.

19. The coin box assembly of claim 15, wherein said catch flange has three spaced apart catch tabs and said top wall has three spaced apart channels with each of said three spaced apart catch tabs located at least partially within one of said three spaced apart channels.

20. The coin box assembly of claim 19, wherein each of said three spaced apart channels has a channel aperture located between a front end and a back end, each of said front ends having with a stop face and a ledge overhanging said stop face and extending into said channel aperture.

* * * * *